United States Patent
Girt (10) Patent No.: US 6,689,497 B1
(45) Date of Patent: Feb. 10, 2004

(54) STABILIZED AFC MAGNETIC RECORDING MEDIA WITH REDUCED LATTICE MISMATCH BETWEEN SPACER LAYER(S) AND MAGNETIC LAYERS

(75) Inventor: Erol Girt, Berkeley, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 8 days.

(21) Appl. No.: 10/035,432

(22) Filed: Jan. 4, 2002

Related U.S. Application Data (60) Provisional application No. 60/260,396, filed on Jan. 8, 2001.

(51) Int. Cl.[7] .............................. G11B 5/66; G11B 5/70; B05D 5/12
(52) U.S. Cl. .............................. 428/694 TM; 428/336; 428/668; 428/900; 427/128; 427/131
(58) Field of Search ................... 428/694 TM, 336, 428/900, 668; 427/130, 131, 128, 129

(56) References Cited

U.S. PATENT DOCUMENTS

| | | | |
|---|---|---|---|
| 5,408,377 A | 4/1995 | Gurney et al. | 360/113 |
| 5,465,185 A | 11/1995 | Heim et al. | 360/113 |
| 5,598,308 A | 1/1997 | Dieny et al. | 360/113 |
| 5,701,223 A | 12/1997 | Fontana, Jr. et al. | 360/113 |
| 6,031,692 A | 2/2000 | Kawawake et al. | 360/113 |
| 6,051,309 A | 4/2000 | Fujikata et al. | 428/332 |
| 6,156,404 A | 12/2000 | Ross et al. | 428/65.3 |
| 6,191,926 B1 | 2/2001 | Everitt et al. | 360/324.11 |
| 6,280,813 B1 * | 8/2001 | Carey et al. | 428/65.3 |
| 6,416,839 B1 * | 7/2002 | Xuan et al. | 428/65.4 |
| 6,537,684 B1 * | 3/2003 | Doerner et al. | 428/611 |

OTHER PUBLICATIONS

Malhotra S.S., et al., "Effect of CrRu Underlayer on the Magnetic, Recording, and Thermal Stability Characteristics of CoCrPtTa Thin Film Media", Sep. 2000, IEEE Trans. Magn., vol. 36, No. 5, pp 2309–2311.*

Ounadjela K., et al., "Perpendicular anisotropy and antiferromagnetic coupling in Co/Ru strained superlattices", Apr. 1992, Phys. Rev. B, vol. 45, No. 14, pp. 7768–7771.*

* cited by examiner

*Primary Examiner*—Holly Rickman
(74) *Attorney, Agent, or Firm*—McDermott, Will & Emery (57) ABSTRACT

An anti-ferromagnetically coupled (AFC) magnetic recording medium having improved thermal stability and signal-to-medium noise ratio (SMNR), comprising:
   a non-magnetic substrate having at least one surface; and
   a layer stack overlying the at least one surface, the layer stack comprising at least one layer pair composed of first and second superposed, crystalline ferromagnetic layers spaced-apart by a crystalline non-magnetic spacer layer providing anti-ferromagnetic coupling (AFC) between the first and second ferromagnetic layers;
   wherein the lattice constants of the crystalline non-magnetic spacer layer are substantially matched to the lattice constants of each of the first and second crystalline ferromagnetic layers for obtaining a desired crystalline orientation and microstructure of said ferromagnetic layers without significantly degrading the interface exchange energy density J of the AFC.

19 Claims, 4 Drawing Sheets

STABILIZED AFC MAGNETIC RECORDING MEDIA WITH REDUCED LATTICE MISMATCH BETWEEN SPACER LAYER(S) AND MAGNETIC LAYERS

CROSS REFERENCE TO PROVISIONAL APPLICATION

This application claims priority from U.S. provisional patent application Serial No. 60/260,396 filed Jan. 8, 2001, the entire disclosure of which is incorporated herein by reference.

FIELD OF THE INVENTION

The present invention relates to very high areal density magnetic recording media exhibiting improved thermal stability, such as hard disks. More particularly, the present invention relates to longitudinal, anti-ferromagnetically coupled ("AFC") magnetic recording media including improved spacer layers providing reduced or optimized lattice mismatch with vertically spaced-apart ferromagnetic layers.

BACKGROUND OF THE INVENTION

Magnetic recording ("MR") media and devices incorporating same are widely employed in various applications, particularly in the computer industry for data/information storage and retrieval applications, typically in disk form. Conventional thin-film type magnetic media, wherein a fine-grained polycrystalline magnetic alloy layer serves as the active recording layer, are generally classified as "longitudinal" or "perpendicular", depending upon the orientation of the magnetic domains of the grains of magnetic material.

Figure 1:
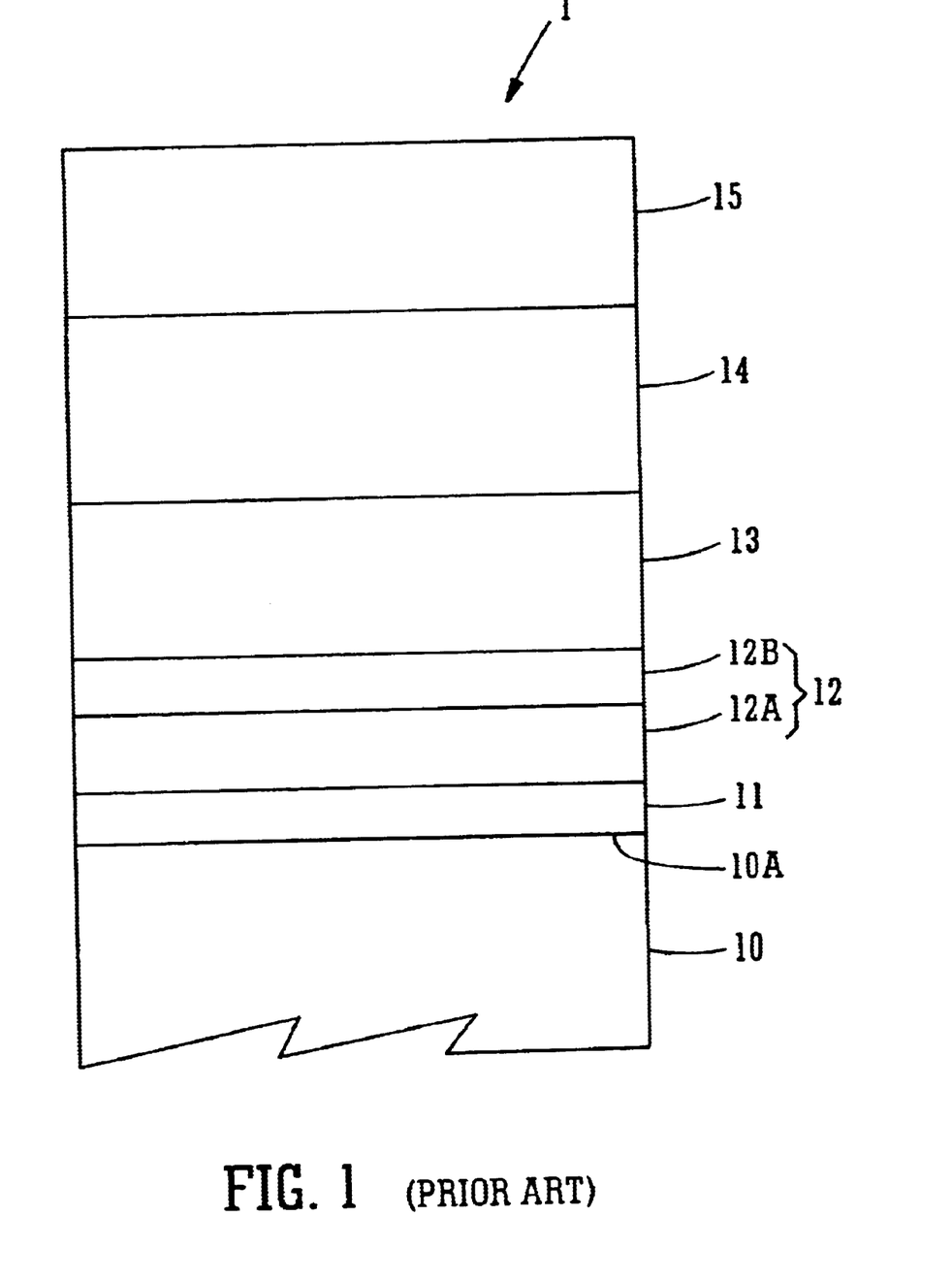
FIG. 1 schematically illustrates, in simplified cross-sectional view, a portion of a conventional thin-film, longitudinal-type magnetic disk recording medium.

A portion of a conventional longitudinal recording, thin-film, hard disk-type magnetic recording medium 1 commonly employed in computer-related applications is schematically illustrated in FIG. 1 in simplified cross-sectional view, and comprises a substantially rigid, non-magnetic metal substrate 10, typically of aluminum (Al) or an aluminum-based alloy, such as an aluminum-magnesium (Al—Mg) alloy, having sequentially deposited or otherwise formed on a surface 10A thereof a plating layer 11, such as of amorphous nickel-phosphorus (Ni—P); a seed layer 12A of an amorphous or fine-grained material, e.g., a nickel-aluminum (Ni—Al) or chromium-titanium (Cr—Ti) alloy; a polycrystalline underlayer 12B, typically of Cr or a Cr-based alloy, a magnetic recording layer 13, e.g., of a cobalt (Co)-based alloy with one or more of platinum (Pt), Cr, boron (B), etc.; a protective overcoat layer 14, typically containing carbon (C), e.g., diamond-like carbon ("DLC"); and a lubricant topcoat layer 15, e.g., of a perfluoropolyether. Each of layers 11–14 may be deposited by suitable physical vapor deposition ("PVD") techniques, such as sputtering, and layer 15 is typically deposited by dipping or spraying.

In operation of medium 1, the magnetic layer 13 is locally magnetized by a write transducer or write "head", to record and thereby store data/information therein. The write transducer or head creates a highly concentrated magnetic field which alternates direction based on the bits of information to be stored. When the local magnetic field produced by the write transducer is greater than the coercivity of the material of the recording medium layer 13, the grains of the polycrystalline material at that location are magnetized. The grains retain their magnetization after the magnetic field applied thereto by the write transducer is removed. The direction of the magnetization matches the direction of the applied magnetic field. The magnetization of the recording medium layer 13 can subsequently produce an electrical response in a read transducer, or read "head", allowing the stored information to be read.

Efforts are continually being made with the aim of increasing the areal recording density, i.e., the bit density, or bits/unit area, and signal-to-medium noise ratio ("SMNR") of the magnetic media. However, severe difficulties are encountered when the bit density of longitudinal media is increased above about 20–50 Gb/in$^2$ in order to form ultra-high recording density media, such as thermal instability, when the necessary reduction in grain size exceeds the superparamagnetic limit. Such thermal instability can, inter alia, cause undesirable decay of the output signal of hard disk drives, and in extreme instances, result in total data loss and collapse of the magnetic bits.

One proposed solution to the problem of thermal instability arising from the very small grain sizes associated with ultra-high recording density magnetic recording media, including that presented by the superparamagnetic limit, is to increase the crystalline anisotropy, thus the squareness of the magnetic bits, in order to compensate for the smaller grain sizes. However, this approach is limited by the field provided by the writing head.

Another proposed solution to the problem of thermal instability of very fine-grained magnetic recording media is to provide stabilization via coupling of the ferromagnetic recording layer with another ferromagnetic layer or an anti-ferromagnetic layer. In this regard, it has been recently proposed (E. N. Abarra et al., IEEE Conference on Magnetics, Toronto, April 2000) to provide a stabilized magnetic recording medium comprised of at least a pair of ferromagnetic layers which are anti-ferromagnetically-coupled ("AFC") by means of an interposed thin, non-magnetic spacer layer. The coupling is presumed to increase the effective volume of each of the magnetic grains, thereby increasing their stability; the interface exchange energy density, J, between the ferromagnetic layer pairs being a key parameter in determining the increase in stability.

However, a drawback associated with the above-described approach is encountered when a number of materials, e.g., Ru, are utilized as the non-magnetic spacer layer for providing AFC between Co-based ferromagnetic layers, as are typically employed in the fabrication of high areal density magnetic recording media. Illustratively, the lattice constants of hexagonal close-packed ("hcp") Ru are a=2.714Å and c=4.299 Å, which lattice constants are frequently much larger than the corresponding lattice constants of the typically employed hcp Co-based ferromagnetic layers. Thus, in order to obtain a desired crystallographic orientation (e.g., an in-plane alignment of the c-axis) and microstructure of the Co-based ferromagnetic layer(s) grown on the non-magnetic spacer layer, the mismatch between the lattice constants of the non-magnetic spacer layer and the Co-based ferromagnetic layers on opposite sides of the non-magnetic spacer layer must be adjusted, i.e., reduced or optimized, in order to obtain optimal or maximal performance of the AFC media.

Accordingly, there exists a need for improved methodology for providing thermally stable, high areal density magnetic recording media, e.g., longitudinal media, with large interface exchange energy density, J, optimal microstructure and crystallographic orientation (i.e., in-plane alignment of the c-axis), and reduced or optimized lattice mismatch between vertically separated ferromagnetic layers and a non-magnetic spacer layer (such as of a Ru-based material) providing anti-ferromagnetic coupling (AFC) of the ferromagnetic layers, wherein each of the ferromagnetic layers is formed of a ferromagnetic alloy composition similar to compositions conventionally employed in fabricating longitudinal magnetic recording media, which methodology can be implemented at a manufacturing cost compatible with that of conventional manufacturing technologies for forming high areal density magnetic recording media. There also exists a need for improved, high areal density magnetic recording media, e.g., in disk form, which media include at least one pair of anti-ferromagnetically coupled ferromagnetic alloy layers separated by a non-magnetic spacer layer, wherein each of the ferromagnetic layers is formed of a ferromagnetic alloy composition similar to compositions conventionally utilized in longitudinal magnetic recording media (such as Co-based alloys) and the lattice mismatch between each of the ferromagnetic layers and the non-magnetic spacer layer is reduced or optimized, leading to improved thermal stability.

The present invention, therefore, addresses and solves problems attendant upon forming high areal recording density magnetic recording media, e.g., in the form of hard disks, which media utilize anti-ferromagnetic coupling between vertically spaced-apart pairs of ferromagnetic layers for enhancing thermal stability, while providing full compatibility with all aspects of conventional automated manufacturing technology. Moreover, manufacture and implementation of the present invention can be obtained at a cost comparable to that of existing technology.

DISCLOSURE OF THE INVENTION

An advantage of the present invention is an improved, high areal recording density magnetic recording medium having increased thermal stability and signal-to-medium noise ratio ("SMNR").

Another advantage of the present invention is an improved, high areal recording density, longitudinal magnetic recording medium having reduced or optimized lattice mismatch between a pair of vertically spaced-apart ferromagnetic layers and a non-magnetic spacer layer providing anti-ferromagnetic coupling between the spaced-apart ferromagnetic layers.

Yet another advantage of the present invention is an improved method for manufacturing a high areal recording density magnetic recording medium having increased thermal stability and signal-to-medium noise ratio ("SMNR").

Still another advantage of the present invention is an improved method for manufacturing a high areal recording density, longitudinal magnetic recording medium having reduced or optimized lattice mismatch between a pair of vertically spaced-apart ferromagnetic layers and a non-magnetic spacer layer providing anti-ferromagnetic coupling between the spaced-apart ferromagnetic layers. Additional advantages and other features of the present invention will be set forth in the description which follows and in part will become apparent to those having ordinary skill in the art upon examination of the following or may be learned from the practice of the present invention. The advantages of the present invention may be realized as particularly pointed out in the appended claims.

According to one aspect of the present invention, the foregoing and other advantages are obtained in part by an anti-ferromagnetically coupled (AFC) magnetic recording medium having improved thermal stability and signal-to-medium noise ratio (SMNR), comprising:

a non-magnetic substrate having at least one surface; and a layer stack overlying the at least one surface, the layer stack comprising at least one layer pair comprised of first and second superposed, crystalline ferromagnetic layers spaced-apart by a crystalline, non-magnetic spacer layer providing anti-ferromagnetic coupling (AFC) between the first and second ferromagnetic layers;

wherein the lattice constants of the crystalline, non-magnetic spacer layer are substantially matched to the lattice constants of each of the first and second crystalline ferromagnetic layers for obtaining a desired crystalline orientation and microstructure of the ferromagnetic layers without significantly degrading the interface exchange energy density J of the AFC.

According to embodiments of the present invention, each of the first and second ferromagnetic layers comprises a single ferromagnetic layer or a plurality of ferromagnetic sub-layers, wherein each of the first and second ferromagnetic layers comprises at least one ferromagnetic alloy, e.g., at least one Co-based alloy, and the c-axis in-plane alignment of the at least one Co-based alloy is improved as a result of the lattice matching.

In accordance with the present invention, Co-based alloys include alloys of Co with at least one element selected from the group consisting of Pt, Cr, B, Fe, Ta, Ni, Mo, V, Nb, Ru, Si, and Ge; and the non-magnetic spacer layer comprises an alloy, e.g., one or more layers of one or more Ru-based alloys, such as alloys of Ru with at least one of Cr, Rh, Ir, and Ta.

In accordance with particular embodiments of the present invention, the single ferromagnetic layer and each of the plurality of ferromagnetic sub-layers comprises an alloy of Co with at least one element selected from the group consisting of Pt, Cr, B, Fe, Ta, Ni, Mo, V, Nb, Ru, Si, and Ge; and the non-magnetic spacer layer comprises one or more layers of one or more Ru-based alloys selected from Ru alloyed with at least one element selected from Cr, Rh, Ir, and Ta or a Ru-based alloy layer wherein the concentration of the alloying element(s) is continuously varied across the thickness of the layer; each of the first and second ferromagnetic layers is from about 8 to about 300 Å thick; and the non-magnetic spacer layer is from about 4 to about 20 Å thick.

According to further embodiments of the present invention, the layer stack includes a plurality of layer pairs, each comprised of the superposed first and second crystalline ferromagnetic layers spaced-apart and anti-ferromagnetically coupled together by a crystalline non-magnetic spacer layer having lattice constants which are substantially matched to the lattice constants of the first and second ferromagnetic layers.

In accordance with still further embodiments of the present invention, the magnetic recording medium further comprises seed and underlayers between the at least one surface of the substrate and the layer stack for controlling the crystallographic texture of the at least one layer pair of first and second crystalline ferromagnetic layers; and protective overcoat and lubricant topcoat layers provided on an upper surface of the layer stack.

According to another aspect of the present invention, a method of forming a magnetic recording medium having improved thermal stability and signal-to-media noise ratio (SMNR), comprises steps of:

(a) forming a layer stack overlying at least one surface of a non-magnetic substrate, the layer stack including at least one layer pair comprised of first and second superposed, spaced-apart, crystalline ferromagnetic layers; and (b) providing a crystalline, non-magnetic spacer layer between the first and second ferromagnetic layers for inducing anti-ferromagnetic coupling (AFC) of the first and second ferromagnetic layers, the lattice constants of the crystalline, non-magnetic spacer layer being substantially matched to the lattice constants of each of the first and second crystalline ferromagnetic layers for obtaining a desired crystalline orientation and microstructure of the ferromagnetic layers without significantly degrading the interface exchange energy density J of the AFC.

According to embodiments of the present invention, step (a) comprises forming a layer stack wherein each of the first and second ferromagnetic layers is comprised of a single ferromagnetic layer or a plurality of ferromagnetic sublayers, wherein each of the first and second ferromagnetic layers comprises at least one ferromagnetic alloy; and step (b) comprises providing a crystalline, non-magnetic alloy spacer layer.

In accordance with particular embodiments of the present invention, the at least one ferromagnetic alloy is a Co-based alloy and the c-axis in-plane alignment of the at least one Co-based alloy layer is improved as a result of the lattice matching; and the non-magnetic alloy spacer layer comprises one or more layers of one or more Ru-based alloys or a Ru-based alloy layer wherein the concentration of the alloying element(s) is continuously varied across the thickness of the layer. For example, the at least one Co-based alloy comprises Co alloyed with at least one element selected from the group consisting of Pt, Cr, B, Fe, Ta, Ni, Mo, V, Nb, Ru, Si, and Ge; and the Ru-based alloys are selected from Ru alloyed with at least one element selected from Cr, Rh, Ir, and Ta.

According to further particular embodiments of the present invention, step (a) comprises providing a layer stack wherein each of the first and second ferromagnetic layers is from about 8 to about 300 Å thick; and step (b) comprises providing a crystalline, non-magnetic spacer layer from about 4 to about 20 Å thick.

According to still further embodiments of the present invention, step (a) comprises providing the layer stack as including a plurality of the layer pairs, each comprised of superposed, spaced-apart, crystalline first and second ferromagnetic layers; and step (b) comprises providing a crystalline, non-magnetic spacer layer between each of the first and second ferromagnetic layers of each layer pair for inducing anti-ferromagnetic coupling therebetween.

In accordance with yet further embodiments of the present invention, step (a) further comprises providing seed and underlayers between the at least one surface of the substrate and the layer stack for controlling the crystallographic texture of the at least one layer pair of first and second crystalline ferromagnetic layers; and the method further comprises the step of: (c) providing protective overcoat and lubricant topcoat layers on an upper surface of the layer stack.

Still another aspect of the present invention is a high areal density magnetic recording medium having improved thermal stability and signal-to-medium noise ratio (SMNR), comprising:

at least one pair of superposed, spaced-apart, anti-ferromagnetically coupled (AFC) crystalline ferromagnetic layers; and means for obtaining a desired crystalline orientation and microstructure of the ferromagnetic layers without significantly degrading the interface exchange energy density J of the AFC.

Additional advantages and aspects of the present invention will become readily apparent to those skilled in the art from the following detailed description, wherein embodiments of the present invention are shown and described, simply by way of illustration of the best mode contemplated for practicing the present invention. As will be described, the present invention is capable of other and different embodiments, and its several details are susceptible of modification in various obvious respects, all without departing from the spirit of the present invention. Accordingly, the drawings and description are to be regarded as illustrative in nature, and not as limitative.

BRIEF DESCRIPTION OF THE DRAWINGS

The following detailed description of the embodiments of the present invention can best be understood when read in conjunction with the following drawings, in which the various features are not necessarily drawn to scale but rather are drawn as to best illustrate the pertinent features, and in which like reference numerals are employed throughout to designate similar features, wherein.

DESCRIPTION OF THE INVENTION

The present invention is based upon recognition that high areal density, thin-film magnetic recording media, e.g., longitudinal recording media, having improved thermal stability and signal-to-media noise ratio (SMNR), can be reliably and controllably manufactured by inducing anti-ferromagnetic coupling (AFC) between a pair of vertically spaced-apart, crystalline ferromagnetic layers, by interposition of a crystalline, non-magnetic spacer layer between the pair of vertically spaced-apart ferromagnetic layers, wherein the alloy composition of the non-magnetic spacer layer is selected to improve its lattice-match with each of the pair of ferromagnetic layers (i.e., by reducing or optimizing mismatch), whereby the microstructure and c-axis in-plane alignment of the spaced-apart ferromagnetic layers is improved without significant adverse effect on the interface exchange energy density J of the AFC between the pair of spaced-apart ferromagnetic layers, leading to increased thermal stability and SMNR.

The inventive methodology affords several advantages not obtainable according to the conventional art, including, inter alia, improved microstructure and increased c-axis in-plane alignment of vertically spaced-apart pairs of ferromagnetic layers composed of alloy compositions typically employed in the fabrication of longitudinal recording media, e.g., Co-based alloys, hence improved thermal stability and SMNR; and reliable, controllable, and cost-effective formation of thermally stable, very high areal density magnetic recording media utilizing conventional manufacturing techniques and instrumentalities, e.g., sputtering techniques and apparatus.

According to the invention, a thin, crystalline, non-magnetic spacer layer from about 4–20 Å thick, e.g., about 6–10 Å thick, or a plurality of non-magnetic spacer layers having a total thickness of about 4–20 Å, e.g., about 6–10 Å, is (are) interposed between a pair of crystalline ferromagnetic layers, the lattice constants of the crystalline, non-magnetic spacer layer(s) being well-matched to the corresponding lattice constants of each of the pair of ferromagnetic layers for improving the microstructure and increasing the c-axis in-plane alignment of the ferromagnetic layers.

Specifically, studies by the present inventor of a series of sandwich structures including at least one spaced-apart pair of crystalline layers of ferromagnetic alloy compositions similar to those conventionally employed in the fabrication of thin film magnetic recording media, e.g., Co-based magnetic alloy layers, have demonstrated the beneficial presence of at least one lattice-matched, thin, crystalline, non-magnetic spacer layer, e.g., of an alloy, such as $Ru_{100-\delta}Cr_\delta$, between the pair of spaced-apart, crystalline, ferromagnetic alloy layers, e.g., Co-based ferromagnetic alloy layers, on enhancement of the microstructure and c-axis in-plane alignment of the ferromagnetic layers.

Figure 2:
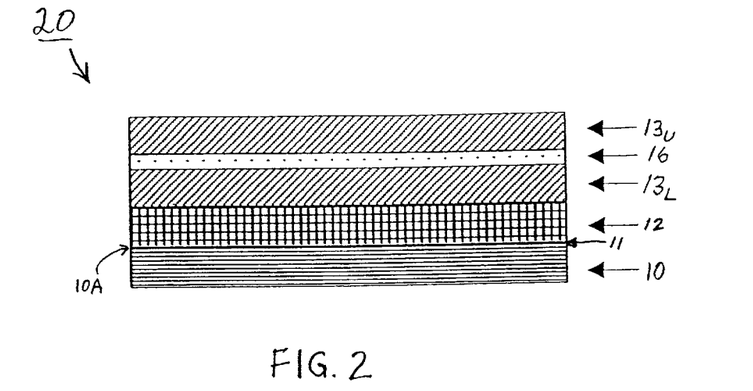
FIGS. 2, 2(A) and 3 schematically illustrate, in simplified cross-sectional view, portions of embodiments of anti-ferromagnetically coupled (AFC) magnetic recording media according to the present invention.
Figure 3:
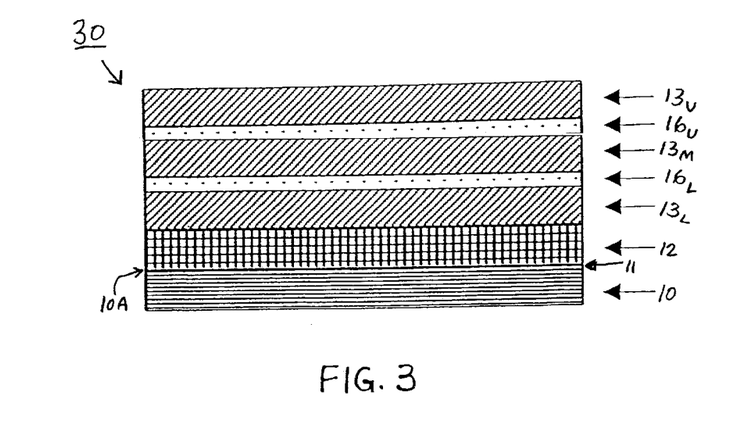

FIGS. 2–3 schematically illustrate, in simplified cross-sectional view, embodiments of magnetic recording media embodying the inventive concept. A first embodiment of a magnetic recording medium 20 according to the invention is shown in FIG. 2 and includes a non-magnetic substrate 10 selected from among non-magnetic metals and alloys, Al, Al-based alloys such as Al—Mg alloys, NiP-plated Al (NiP/Al), glass, ceramics, polymers, and composites of the aforementioned materials. The thickness of substrate 10 is not critical; however, in the case of magnetic recording media for use in hard disk applications, substrate 10 must be of a thickness sufficient to provide the necessary rigidity. Substrate 10 typically comprises Al or an Al-based alloy, e.g., an Al—Mg alloy, and includes on the surface 10A thereof a plating layer 11, e.g., a layer of amorphous NiP. Formed on the plating layer 11 is an underlayer layer 12 for controlling the crystallographic texture and properties of ferromagnetic Co-based alloy layers deposited thereover, which underlayer 12 includes first, or lower, and second, or upper, portions 12A and 12B, respectively, as shown in FIG. 1, wherein the first, or lower portion 12A is a seed layer comprised of an amorphous or fine-grained material, e.g., a Ni—Al or Cr—Ti alloy layer from about 10 to about 1,000 Å thick, and the second, or upper portion 12B is a polycrystalline underlayer, typically a Cr or Cr-based alloy layer (e.g., of Cr—W, Cr—Mo, CoCr, etc.) from about 10 to about 300 Å thick.

According to the invention, the single ferromagnetic layer 13 of the conventionally-structured magnetic recording medium 1 of FIG. 1 is replaced with a sandwich-type structure comprised of a pair of strongly anti-ferromagnetically coupled, crystalline ferromagnetic layers, i.e., a first, or lower, ferromagnetic layer $13_L$ and a second, or upper, ferromagnetic layer $13_U$, which pair of ferromagnetic layers are spaced-apart by at least one thin, crystalline, non-magnetic anti-ferromagnetic coupling (AFC) layer 16.

By way of illustration, but not limitation, according to the invention, each of the first, or lower, and second, or upper, ferromagnetic layers $13_L$ and $13_U$, respectively, may comprise an about 8 to about 300 Å thick crystalline layer of at least one alloy of Co with at least one of Pt, Cr, B, Fe, Ta, Ni, Mo, V, Nb, Ru, Si, and Ge; the at least one thin, crystalline, non-magnetic spacer layer 16 is selected to provide a large RKKY-type coupling effect, and may comprise nearly any non-magnetic material, e.g., Ru, Ru-based alloys, Cr, and Cr-based alloys, illustratively a layer of Ru or a Ru-based alloy, such as Ru alloyed with at least one element selected from Cr, Rh, Ir, and Ta, from about 4 to about 20 Å thick, preferably from about 6 to about 10 Å thick. For example, the non-magnetic spacer layer 16 may comprise a $Ru_{100-\delta}Cr_\delta$ alloy (where $\delta<40$ at. %), a $Ru_{100-\delta}Cr_\delta Ta_y$ alloy (where $\delta=0-30$ at. % and $y=0-10$ at. %), a $Ru_{100-\delta}Rh_\delta$ alloy (where $\delta=0-20$ at. %), a $Ru_{100-\delta}Ir_\delta$ Ir alloy (where $\delta=0-15$ at. %), etc.

Figure 2A:
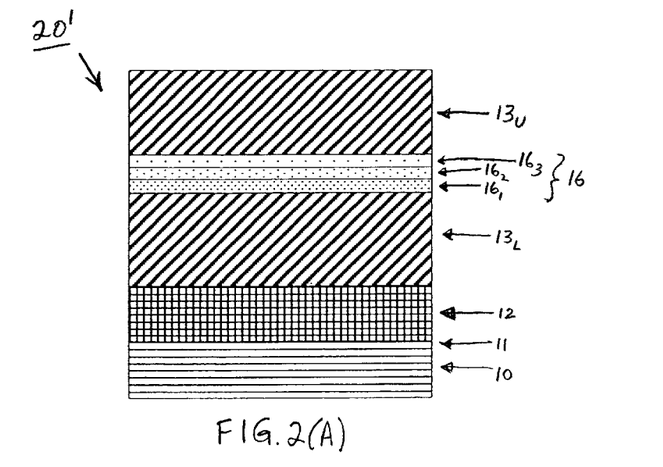

FIG. 2(A) schematically illustrates, in simplified cross-sectional view, an AFC magnetic recording medium 20′ in the form of a variation of the embodiment shown in FIG. 2, wherein the non-magnetic spacer layer 16 comprises a plurality of thin, non-magnetic spacer layers $16_n$ rather than a single layer. By way of illustration, but not limitation, in the specific embodiment shown in FIG. 2(A), three (3) spacer layers $16_1$, $16_2$, and $16_3$, are provided intermediate the upper and lower ferromagnetic layers $13_U$ and $13_L$, respectively. According to the invention, each of the spacer layers $16_1$, $16_2$, and $16_3$ may, for example, be comprised of a different one of the aforementioned Ru-based alloys, i.e., $Ru_{100-x}X_x$ alloys where $X=Cr$, Rh, Ir, and/or Ta and $x<40$, with the total thickness of spacer layers $16_1$, $16_2$, and $16_3$ comprising spacer layer 16 being about 4–20 Å, preferably about 6–10 Å.

According to a yet another variation of the embodiment of an AFC magnetic recording medium 20 shown in FIG. 2, the non-magnetic spacer layer 16 comprises a Ru-based alloy wherein the concentration of the alloying element(s), e.g., at least one element selected from Cr, Rh, Ir, and Ta, is continuously varied across the thickness of the layer.

Each of the layers of the magnetic media 20, 20′, etc., contemplated by the present invention, including spacer layer 16, may be deposited or otherwise formed by any suitable physical vapor deposition technique (PVD), e.g., sputtering, or by a combination of PVD techniques, i.e., sputtering, vacuum evaporation, etc. Protective overcoat and lubricant topcoat layers respectively analogous to layers 14 and 15 shown in FIG. 1 are typically provided, in conventional fashion, over the upper surface of the second, or upper, ferromagnetic layer $13_U$, which layers are not shown in FIGS. 2–3 in order not to unnecessarily obscure the key features of the invention.

The present invention also contemplates formation of magnetic recording media comprising a plurality of superposed pairs of anti-ferromagnetically coupled, crystalline ferromagnetic layers 13, wherein the ferromagnetic layers of each pair may be constituted as described above with respect to FIG. 2, and separated by a crystalline, thin, non-magnetic spacer layer 16. Referring to FIG. 3, shown therein is a magnetic recording medium 30 according to the invention, which medium includes three ferromagnetic layers 13, i.e., lower, middle, and upper layers $13_L$, $13_M$, and $13_U$, respectively, spaced-apart by substantially similarly constituted lower and upper thin, crystalline, non-magnetic spacer layers $16_L$ and $16_U$, respectively, each providing anti-ferromagnetic coupling between respective pairs of vertically spaced-apart ferromagnetic layers 13.

Figure 4A:
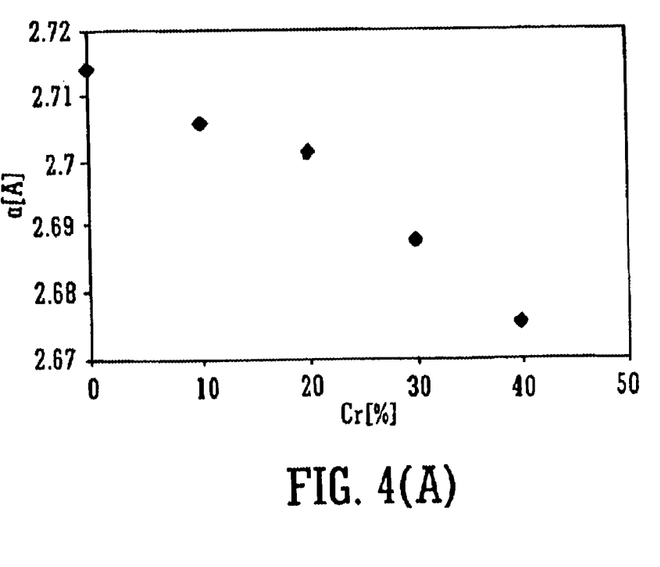
FIGS. 4(A)–4(B) are graphs illustrating the variation of the a and c lattice constants of hcp $Ru_{100-\delta}Cr_\delta$ alloy, as a function of Cr content in %.
Figure 4B:
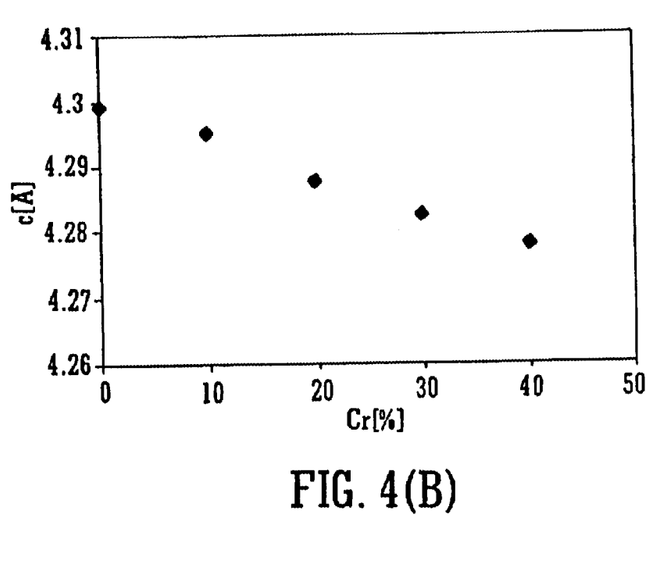

Adverting to FIGS. 4(A) and 4(B), graphically illustrated therein is the variation in the lattice constants a and c, respectively, of hexagonal close-packed (hcp) $Ru_{100-\delta}Cr_\delta$ alloys, as a function of Cr content (atm %), as determined by X-ray diffraction studies. As is evident from the figures, an increase in the Cr content δ (when δ<40) results in a substantially constant decrease in the lattice constants a and c from their respective initial values of 2.714 Å and 4.299 Å for pure (i.e., unalloyed) Ru to corresponding a and c values of 2.676 Å and 4.278 Å for $Ru_{60}Cr_{40}$.

Inasmuch as the initial a and c values, i.e., of pure or unalloyed Ru, are larger than the corresponding a and c values of many hexagonal close-packed (hcp), Co-based ferromagnetic alloys commonly utilized in the fabrication of high coercivity, high areal density, thin-film magnetic recording media, poor lattice matching is typically obtained in structures comprising a pure Ru-based non-magnetic spacer layer sandwiched between a pair of Co alloy-based ferromagnetic layers, leading to less than maximal interface exchange energy density J. However, the decrease in lattice constants a and c observed with addition of Cr to Ru, as in the form of Ru—Cr alloys (illustrated in FIGS. 4(A)–4(B)), indicates that crystalline, non-magnetic $Ru_{100-\delta}Cr_\delta$ alloys, where δ<40, can provide better lattice-matching with a pair of Co-based ferromagnetic alloy layers than is obtainable with pure, unalloyed Ru, while maintaining the interface exchange energy density J.

Figure 5:
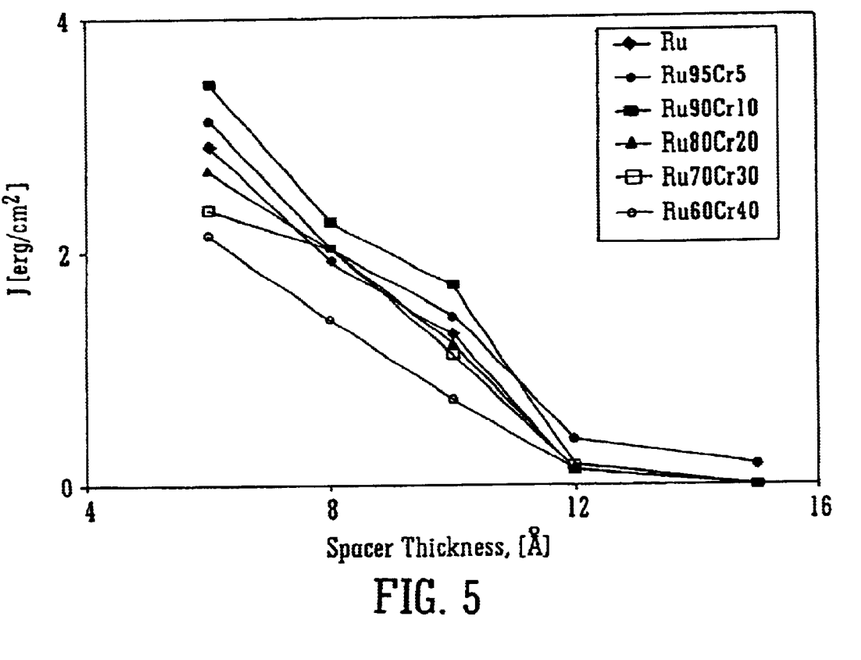
FIG. 5 is a graph showing variation of interface exchange current density J between a pair of anti-ferromagnetically coupled, room temperature sputtered Co-based ferromagnetic layers, as a function of $Ru_{100-\delta}Cr_\delta$ spacer layer thickness, for Cr contents in the range from 0 to 40 atm % Cr.

Referring to FIG. 5, graphically shown therein is the variation of interface exchange energy density J between a pair of room temperature sputtered crystalline, Co alloy based ferromagnetic layers as a function of thickness of a crystalline, non-magnetic $Ru_{100-\delta}Cr_\delta$ spacer layer, for δ<40, as determined by vibrating sample measurements ("VSM"). As may be seen from the figure, an increase in interface exchange energy density J, relative to that obtained with pure or unalloyed, crystalline Ru spacer layers, was generally observed when the spacer layer thickness was within the conventional spacer layer thickness range from about 6 to about 10 Å and 5<δ<30, i.e., for Ru—Cr alloys containing from about 5 to about 30 atm % Cr.

Figure 6:
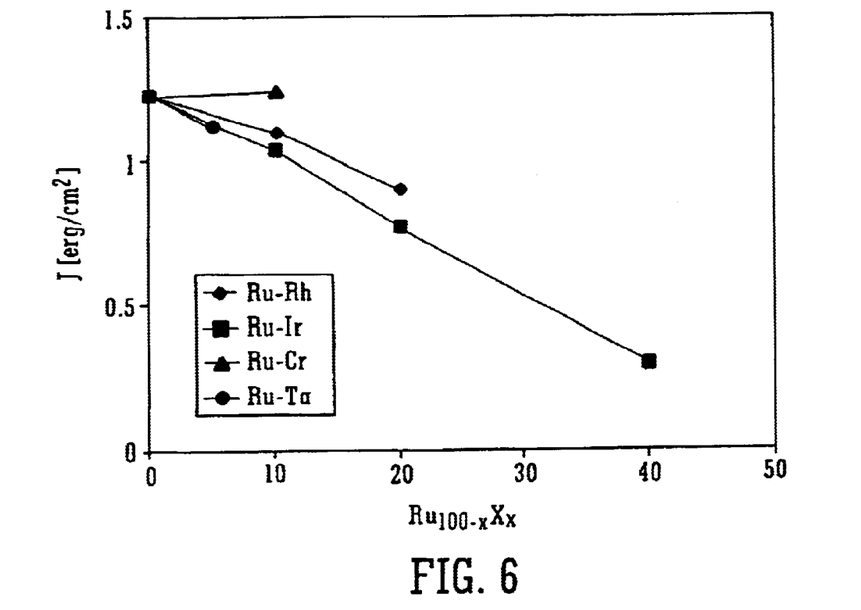
FIG. 6 is a graph showing variation of interface exchange current density J between a pair of anti-ferromagnetically coupled, high temperature (540±20° K) sputtered Co-based ferromagnetic layers, as a function of a function of alloy composition of crystalline, non-magnetic $Ru_{100-x}X_x$ spacer layers, where X=Rh, Ir, Cr, and Ta and x<40.

Adverting to FIG. 6, graphically shown therein is the variation of interface exchange energy density J between a pair of high temperature (~540° K) sputtered crystalline, Co alloy based ferromagnetic layers as a function of alloy composition of crystalline, non-magnetic $Ru_{100-x}X_x$ spacer layers, where X=Rh, Ir, Cr, and Ta and x<40, as determined by VSM. The high temperature sputtered AFC structures with Cr alloying element ($Ru_{100-x}Cr_x$) exhibit substantially constant values of interface exchange energy density J with increasing amount of Cr, in contrast with the room temperature sputtered AFC structures with Cr alloying element ($Ru_{100-x}Cr_x$) of FIG. 5.

The above-described structural and magnetic results indicate that an improvement in microstructure and c-axis in-plane alignment of Co-based ferromagnetic layers of AFC media can be obtained by utilizing crystalline, non-magnetic spacer layers which are well lattice-matched to the crystalline ferromagnetic layers. More specifically, the above-described results demonstrate that partial substitution of Cr for Ru improves matching of the lattice constants between Ru non-magnetic spacer layers and Co alloy-based ferromagnetic layers of AFC media, when the lattice constants of the latter are greater than that of the former (i.e., pure Ru), thereby advantageously resulting in an improvement in microstructure and c-axis in-plane alignment of the ferromagnetic layers, in turn leading to media having enhanced thermal stability and increased SMNR.

The present invention thus advantageously provides high quality, thermally stable, high areal recording density magnetic recording media, which media achieve improved thermal stability via enhanced magnetic coupling of the ferromagnetic recording layer with another ferromagnetic or anti-ferromagnetic layer. Moreover, the inventive methodology can be practiced in a cost-effective manner, utilizing conventional manufacturing technology and equipment (e.g., thermally stable, high areal density magnetic recording media suitable for use in all manner of devices, products, and applications.

In the previous description, numerous specific details are set forth, such as specific materials, structures, processes, etc., in order to provide a better understanding of the present invention. However, the present invention can be practiced without resorting to the details specifically set forth herein. In other instances, well-known processing techniques and structures have not been described in order not to unnecessarily obscure the present invention.

Only the preferred embodiments of the present invention and but a few examples of its versatility are shown and described in the present disclosure. It is to be understood that the present invention is capable of use in various other combinations and environments and is susceptible of changes and/or modifications within the scope of the inventive concept as expressed herein.

What is claimed is:

1. An anti-ferromagnetically coupled (AFC) magnetic recording medium, comprising:

a non-magnetic substrate having at least one surface; and a layer stack overlying said at least one surface, said layer stack comprising at least one layer pair including first and second superposed, crystalline ferromagnetic layers spaced-apart by a crystalline non-magnetic spacer layer providing anti-ferromagnetic coupling (AFC) between said first and second ferromagnetic layers;

wherein the lattice constants of said crystalline non-magnetic spacer layer are substantially matched to the lattice constants of each of said first and second crystalline ferromagnetic layers for obtaining a desired crystalline orientation and microstructure of said ferromagnetic layers without degrading the interface exchange energy density J of the AFC.

2. The magnetic recording medium as in claim 1, wherein:

each of said first and second ferromagnetic layers comprises a single ferromagnetic layer or a plurality of ferromagnetic sub-layers.

3. The magnetic recording medium as in claim 2, wherein:

each of said first and second ferromagnetic layers comprises at least one ferromagnetic alloy.

4. The magnetic recording medium as in claim 3, wherein:

each of said first and second ferromagnetic layers comprises at least one Co-based alloy and the c-axis in-plane alignment of said at least one Co-based alloy is improved as a result of the lattice matching.

5. The magnetic recording medium as in claim 4, wherein said at least one Co-based alloy is selected from alloys of Co with at least one element selected from the group consisting of Pt, Cr, B, Fe, Ta, Ni, Mo, V, Nb, Ru, Si, and Ge.

6. The magnetic recording medium as in claim 1, wherein:

said non-magnetic spacer layer comprises an alloy.

7. The magnetic recording medium as in claim 6, wherein:

said non-magnetic spacer layer comprises one or more layers of one or more Ru-based alloys or a Ru-based alloy layer wherein the concentration of the alloying element(s) is continuously varied across the thickness of the layer.

8. The magnetic recording medium as in claim 7, wherein:

said one or more Ru-based alloys are selected from Ru alloyed with at least one element selected from Cr, Rh, Ir, and Ta.

9. The magnetic recording medium as in claim 3, wherein:

said single ferromagnetic layer and each of said plurality of ferromagnetic sub-layers comprises an alloy of Co with at least one element selected from the group consisting of Pt, Cr, B, Fe, Ta, Ni, Mo, V, Nb, Ru, Si, and Ge; and said non-magnetic spacer layer comprises one or more layers of one or more Ru-based alloys selected from Ru alloyed with at least one element selected from Cr, Rh, Ir, and Ta.

10. The magnetic recording medium as in claim 9, wherein:

each of said first and second ferromagnetic layers is from about 10 to about 300 Å thick; and said non-magnetic spacer layer is from about 4 to about 20 Å thick.

11. The magnetic recording medium as in claim 1, wherein:

said layer stack includes a plurality of layer pairs each comprised of said superposed first and second crystalline ferromagnetic layers spaced-apart and anti-ferromagnetically coupled together by a said crystalline non-magnetic spacer layer having lattice constants which are substantially matched to said lattice constants of said first and second ferromagnetic layers.

12. The magnetic recording medium as in claim 1, further comprising:

seed and underlayers between said at least one surface of said substrate and said layer stack for controlling the crystallographic texture of said at least one layer pair of first and second crystalline ferromagnetic layers; and protective overcoat and lubricant topcoat layers provided on an upper surface of said layer stack.

13. A method of forming a magnetic recording medium, comprising steps of:

(a) forming a layer stack overlying at least one surface of a non-magnetic substrate, said layer stack including at least one layer pair comprised of first and second superposed, spaced-apart, crystalline ferromagnetic layers; and (b) providing a crystalline, non-magnetic spacer layer between said first and second ferromagnetic layers for inducing anti-ferromagnetic coupling (AFC) of said first and second ferromagnetic layers, the lattice constants of said crystalline, non-magnetic spacer layer being substantially matched to the lattice constants of each of said first and second crystalline ferromagnetic layers for obtaining a desired crystalline orientation and microstructure of said ferromagnetic layers without degrading the interface exchange energy density J of the AFC.

14. The method according to claim 13, wherein:

step (a) comprises forming a layer stack wherein each of said first and second ferromagnetic layers is comprised of a single ferromagnetic layer or a plurality of ferromagnetic sub-layers, wherein each of said first and second ferromagnetic layers comprises at least one ferromagnetic alloy; and step (b) comprises providing a non-magnetic alloy spacer layer.

15. The method according to claim 14, wherein:

said at least one ferromagnetic alloy is a Co-based alloy and the c-axis in-plane alignment of the at least one Co-based alloy is improved as a result of said lattice matching; and said non-magnetic alloy spacer layer comprises one or more layers of one or more Ru-based alloys or a Ru-based alloy layer wherein the concentration of the alloying element(s) is continuously varied across the thickness of the layer.

16. The method according to claim 15, wherein:

said at least one Co-based alloy comprises Co alloyed with at least one element selected from the group consisting of Pt, Cr, B, Fe, Ta, Ni, Mo, V, Nb, Ru, Si, and Ge; and said one or more Ru-based alloys are selected from Ru alloyed with at least one element selected from Cr, Rh, Ir, and Ta.

17. The method according to claim 16, wherein:

step (a) comprises providing a layer stack wherein each of said first and second ferromagnetic layers is from about 8 to about 300 Å thick; and step (b) comprises providing a non-magnetic spacer layer from about 4 to about 20 Å thick.

18. The method according to claim 13, wherein:

step (a) comprises providing said layer stack as including a plurality of said layer pairs, each comprised of superposed, spaced-apart, crystalline first and second ferromagnetic layers; and step (b) comprises providing a said crystalline, non-magnetic spacer layer between each of said first and second ferromagnetic layers of each layer pair for inducing anti-ferromagnetic coupling therebetween.

19. The method according to claim 13, wherein:

step (a) further comprises providing seed and underlayers between said at least one surface of said substrate and said layer stack for controlling the crystallographic texture of said at least one layer pair of first and second crystalline ferromagnetic layers; and the method further comprises the step of:

(c) providing protective overcoat and lubricant topcoat layers on an upper surface of said layer stack.

* * * * *